UNITED STATES PATENT OFFICE.

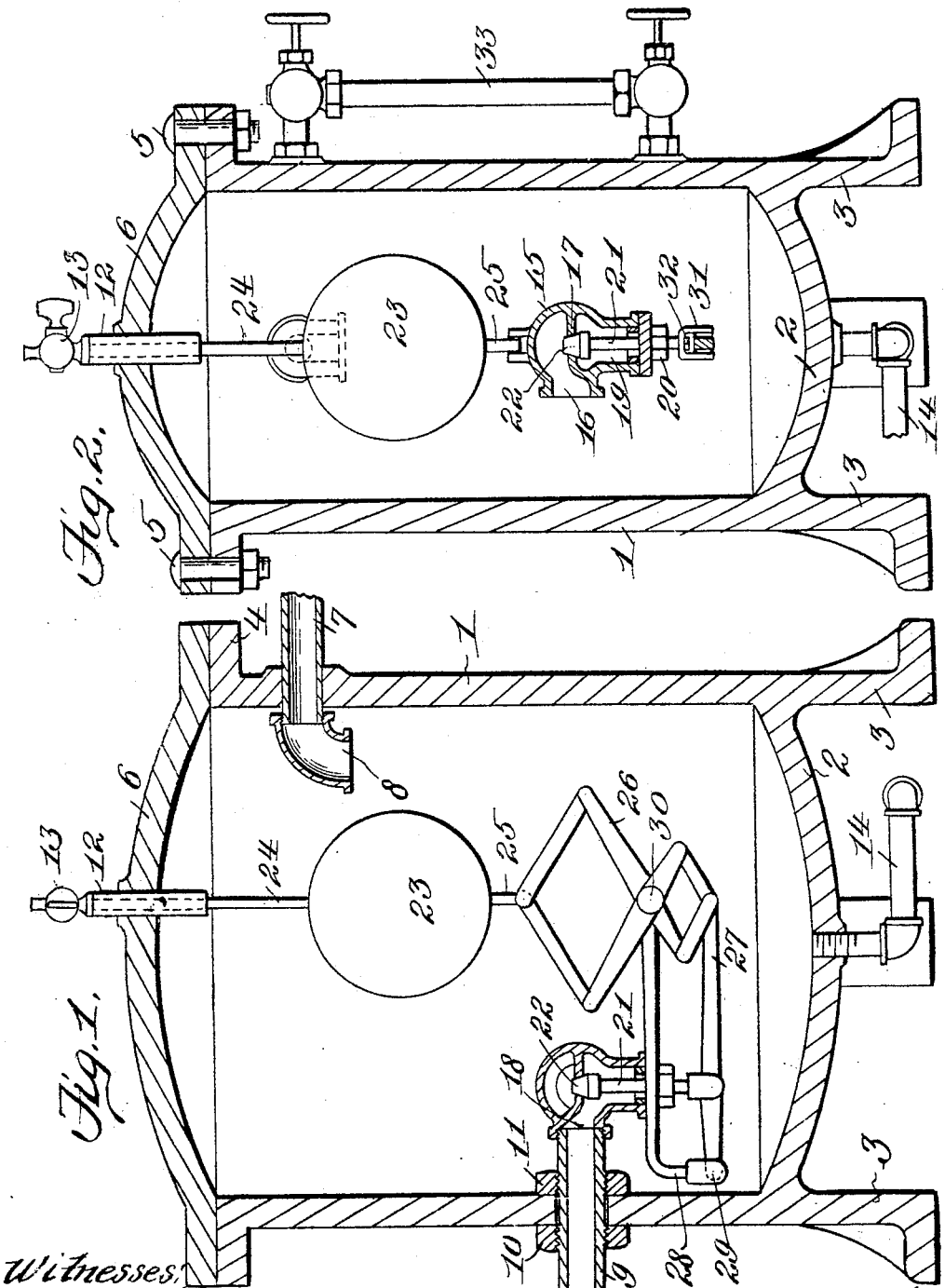

PATRICK J. HEFFERNAN, OF BAYONNE, NEW JERSEY.

STEAM-TRAP.

No. 803,483.  Specification of Letters Patent.  Patented Oct. 31, 1905.

Application filed July 7, 1905. Serial No. 268,699.

*To all whom it may concern:*

Be it known that I, PATRICK J. HEFFERNAN, a citizen of the United States, residing at Bayonne, in the county of Hudson and State of New Jersey, have invented new and useful Improvements in Steam-Traps, of which the following is a specification.

This invention relates to steam-traps adapted for general application.

The invention aims to provide a steam-trap in a manner as hereinafter set forth whereby a positive and regular operation will ensue in the separation of the steam from the water of condensation and so that the water will be discharged at regular intervals from the trap by the automatic actuation of the cut-out valve, thereby offering no detriment to stop the circulation.

The invention further aims to provide a steam-trap in a manner hereinafter set forth, with the outlet-valve so arranged and positioned as to prevent the interposition of burs, grit, or other foreign matter between the valve and seat, so that a satisfactory operation will not be prevented.

A further object of the invention is to construct a steam-trap in a manner as hereinafter described so that the cut-out valve and its actuating mechanism can be readily removed when occasion requires without upsetting the trap and, furthermore, to so set up the outlet-valve that the same is capable of rotation, thereby causing the valve not to contact with the seat successively in the same place.

A further object of the invention is to so construct and arrange the outlet-valve and its actuating mechanism as to enable the employment of an unusually small float and at the same time cause the said valve and its actuating mechanism to be unusually sensitive, so that the valve will be actuated to cause the discharge of the water as it condenses and not have the movement of the valve retarded until the trap entirely fills up, or nearly so, with the water of condensation. By such an operation no detriment is offered to stop circulation.

The invention further aims to construct a steam-trap for general application which shall be simple in its construction, unusually sensitive, so as to continuously discharge the water of condensation, strong, durable, efficient in its use, and comparatively inexpensive to manufacture.

With the foregoing and other objects in view the invention consists of the novel construction, combination, and arrangement of parts hereinafter more specifically described, illustrated in the accompanying drawings, which form a part of this specification, and particularly pointed out in the claims hereunto appended.

In describing the invention in detail reference is had to the accompanying drawings, wherein like reference characters denote corresponding parts throughout both views, and in which—

Figure 1 is a longitudinal sectional view of a steam-trap constructed in accordance with this invention. Fig. 2 is a vertical sectional view thereof.

Referring to the drawings by reference characters, 1 denotes the casing, which forms the body portion of the trap and is preferably constructed with an integral bottom 2 and the supporting-legs 3. The body portion at its top is open and provided with an outwardly-extending flange 4, upon which is secured, through the medium of the holdfast devices 5, a removable dome-shaped cover 6.

Extending into the body portion 1 and arranged at a point near the top thereof is the inlet-pipe 7, having on its inner end a curvilinear deflecting member 8, so that the fluid will be discharged into the body portion in a direction toward the bottom thereof, and, furthermore, extending into the body portion 1 at a point between the bottom 2 and an imaginary longitudinal line through the center of the body portion 1 is an outlet-pipe 9 for the water of condensation, said pipe 9 being locked in position through the medium of an externally-arranged nut 10 and an interiorly-arranged nut 11, said nuts engaging the pipe 9, the latter being screw-threaded for such purpose.

The cover 6 is provided with an opening through which extends an air-blow-off pipe 12, having that portion thereof below the lower face of the cover 6 perforated, so that all the air within the receptacle can be blown off, which otherwise would not be the case, as the said pipe depends below the lower face of the cover 6. The said pipe 12 also acts as a combined guide and retaining means for a float-stem to be hereinafter referred to. Upon the outer end of the pipe 12 is secured a cut-off 13, which is adapted to open and close the pipe 12 when occasion requires.

The bottom 2 of the body portion 1 is provided with a screw-threaded opening in which is secured a discharge-pipe 14 for the various matters collected upon the bottom 2, said pipe 14 being provided with a suitable closure. (Not shown.) The various matters collected upon the bottom 2, the latter being substantially concaved in cross-section, can be when occasion requires blown off through the said pipe 14.

Secured upon the inner end of the pipe 9 and arranged a suitable distance above the bottom 2 of the trap is a valve-casing 15, having an inlet 16, a valve-seat 17, and an outlet 18, which opens into the pipe 9. The valve-chamber 19 of the casing 15 is closed through the medium of a screw-threaded nut 20, which is provided with an opening for the valve-stem 21, the latter carrying on its upper end the valve 22. The opening through the nut 20 is of such diameter as to form a close fit between the stem 21 and the nut, but at the same time allows for a reciprocating movement of the stem 21. The manner in which the valve is arranged within the casing 15 prevents the interposition of any foreign matters between the valve and its seat, so that a satisfactory working of the valve will not be prevented.

The valve-stem 21 is reciprocated through the medium of a float-and-lever mechanism, which is arranged within the body portion 1 and is operated through the medium of the rise and fall of the water of condensation, and said float-and-lever mechanism comprises a float 23, which is preferably spherical in contour and of much smaller diameter than the internal diameter of the body portion 1, and owing to the smallness of the float 23 it is unusually sensitive, so that at the smallest rise or fall of the water of condensation the float will move therewith, and consequently through the medium of the lever mechanism, to be presently described, reciprocate the valve-stem 21, thereby actuating the valve 22. The float 23 at its top has connected thereto a stem 24, which at its upper end engages in the pipe 12, the latter, as before stated, acting as a guide for said stem. The bottom of the float 23 is connected, through the medium of the short rod 25, to the top of a series of toggle-levers 26, such connection causing the contraction or extension of the toggle-levers 26 when the float falls or rises. To the bottom of the toggle-levers 26 one end of a lever-arm 27 is connected, while the other end of said lever-arm 27 is pivoted to an L-shaped bar 28, as at 29. Said L-shaped bar 28 is secured to the nut 20 and has its other end connected to the toggle-levers, as at 30, and acts as a suspension means for the said levers. Said rod 28 also acts as a suspension means for the lever 27. The lever 27 intermediate its ends carries a yoke 31, to which is swivelly connected, as at 32, the lower end of the valve-stem 21. By such a swivel connection it permits the valve-stem 21 to be capable of rotation, so that the valve 22 can also be rotated as the valve is carried upon the upper end of the stem.

The body portion 1 is provided with a water-glass 33 to show the height of the water in the trap.

It is thought that the device is so simple in its construction that the operation thereof can be readily understood; but it will be stated that the rising of the water within the body portion 1 carries the float 23 therewith, which in turn lengthens the toggle-levers 26. Such operation of the toggle-levers 26 actuates the lever 27 in one direction, thereby shifting the valve 22 from its seat and allowing the water of condensation to pass through the inlet 16 of the valve-casing into the valve-chamber. From there it passes out through the outlet 18 and into the pipe 9, where it is discharged to any point desired. When the float 23 lowers, the toggle-levers 26 will be contracted, consequently moving the lever 27 in an opposite direction and causing the valve to be moved toward its seat, so that when the level of the water falls below the inlet 16 the valve 22 will be caused to resume its seat, consequently closing the trap.

By disconnecting the pipe 9 the valve-casing, the valve, and the actuating mechanism therefor can be readily removed from the body portion 1—that is to say, after the cover 6 has been taken off.

The valve in practice is always submerged, except, of course, when the water is drawn off from the trap by way of the pipe 14, the parts being so arranged that the water will not fall at any time within several inches of said valve—say about three inches. I cite this, as will be understood, simply as an illustration.

Having thus fully described my invention, what I claim as new, and desire to secure by Letters Patent, is—

1. A steam-trap comprising a body portion, an inlet and an outlet pipe extending therein, said outlet-pipe arranged at a point removed from the bottom of the body portion, a valve-casing suspended upon the inner end of said pipe and communicating with the interior of the trap, a valve in said casing for closing the same, a toggle-lever mechanism suspended within the body portion and connected with said valve for actuating it, a float connected to said toggle-lever mechanism for actuating it, and a guide for the float.

2. A steam-trap comprising a body portion, an inlet and an outlet pipe extending therein, said outlet-pipe arranged at a point removed from the bottom of the body portion, a valve-casing suspended upon the inner end of said pipe and communicating with the interior of the trap, a valve in said casing for closing the same, a toggle-lever mechanism suspended within the body portion and connected with said valve for actuating it, a float connected to said toggle-lever mechanism for actuating it, and an air-blow-off pipe extending in the body portion and acting as a guide for the float.

3. A steam-trap comprising a body portion, an inlet and an outlet pipe extending therein, said outlet-pipe arranged at a point removed from the bottom of the body portion, a valve-casing suspended upon the inner end of said pipe and communicating with the interior of the trap, a valve in said casing for closing the same, a toggle-lever mechanism suspended within the body portion and connected with said valve for actuating it, a float connected to said toggle-lever mechanism for actuating it, an air-blow-off pipe extending in the body portion and acting as a guide for the float, and a discharge-pipe communicating with the interior of the body portion through the bottom thereof.

4. A steam-trap comprising a body portion, an inlet-pipe extending therein, a transverse outlet-pipe extending through the wall of the body portion, a valve mechanism suspended upon the inner end of said pipe, a float-operated mechanism adapted to actuate the valve mechanism, thereby opening and closing said outlet-pipe, and an air-blow-off pipe extending in said body portion and acting as a guide for said float-operated mechanism.

5. A steam-trap comprising a body portion, an inlet-pipe extending therein, a transverse outlet-pipe extending through the wall of the body portion, a valve mechanism suspended upon the inner end of said pipe, a float-operated mechanism adapted to actuate the valve mechanism, thereby opening and closing said outlet-pipe, and an air-blow-off pipe extending in said body portion and acting as a guide for said float-operated mechanism, that portion of said air-blow-off pipe which depends into the body portion being perforated.

6. A steam-trap comprising a body portion, an inlet and an outlet pipe extending therein, a valve-casing suspended upon the inner end of the outlet-pipe and adapted to establish communication between the interior of the body portion and said outlet-pipe, a valve in said casing for closing the communication, a float-operated mechanism connected with said valve for actuating it, and an air-blow-off pipe depending in said body portion and acting as a guide for said float-operated mechanism.

7. A steam-trap comprising a body portion, an inlet and an outlet pipe extending therein, a valve-casing suspended on the inner end of said outlet-pipe and adapted to establish communication between said outlet-pipe and the interior of the body portion, a valve in said casing for closing the communication and having a depending valve-stem, a bar secured to said casing, a lever-arm pivoted to said bar and to the valve-stem, a toggle-lever mechanism connected with said bar and with said lever, and a float attached to said toggle-lever mechanism and adapted to operate it, thereby actuating said lever and opening and closing the valve.

8. A steam-trap comprising a body portion, an inlet and an outlet pipe extending therein, a valve-casing suspended on the inner end of said outlet-pipe and adapted to establish communication between said outlet-pipe and the interior of the body portion, a valve in said casing for closing the communication and having a depending valve-stem, a bar secured to said casing, a lever-arm pivoted to said bar and to the valve-stem, a toggle-lever mechanism connected with said bar and with said lever, a float attached to said toggle-lever mechanism and adapted to operate it, thereby actuating said lever and opening and closing the valve, a stem connected with the float, and an air-blow-off pipe depending in said casing and acting as a guide for the float-stem.

9. A steam-trap comprising a body portion, an inlet and an outlet pipe extending therein, a valve-casing suspended on the inner end of said outlet-pipe and adapted to establish communication between said outlet-pipe and the interior of the body portion, a valve in said casing for closing the communication and having a depending valve-stem, a bar secured to said casing, a lever-arm pivoted to said bar and to the valve-stem, a toggle-lever mechanism connected with said bar and with said lever, a float attached to said toggle-lever mechanism and adapted to operate it, thereby actuating said lever and opening and closing the valve, a stem connected with the float, and an air-blow-off pipe depending in said casing and acting as a guide for the float-stem, that portion of said air-blow-off pipe which depends in the body portion being perforated.

10. A steam-trap comprising a body portion, an inlet and an outlet pipe extending therein, a valve-casing suspended on the inner end of said outlet-pipe and adapted to establish communication between said outlet-pipe and the interior of the body portion, a valve in said casing for closing the communication and having a depending valve-stem, a bar secured to said casing, a lever-arm pivoted to said bar and to the valve-stem, a toggle-lever mechanism connected with said bar and with said lever, a float attached to said toggle-lever mechanism and adapted to operate it, thereby actuating said lever and opening and closing the valve, a stem connected with the float, an air-blow-off pipe depending in said casing and acting as a guide for the float-stem, that portion of said air-blow-off pipe which depends in the body portion being perforated, and a discharge-pipe communicating with said body portion through the bottom thereof.

11. A steam-trap comprising a body portion having a transversely-extending outlet-pipe, a valve mechanism suspended upon the inner end of said pipe and adapted to establish communication between the interior of the body portion and the said pipe, a float-operated mechanism for actuating said valve mechanism, and an air-blow-off pipe opening into said body portion and acting as a guide for said float-operated mechanism.

12. A steam-trap comprising a body portion, a transversely-extending outlet-pipe therefor, a valve mechanism suspended upon the inner end of said pipe and adapted when actuated to establish communication between the said pipe and the interior of the body portion, a float-operated mechanism suspended from said valve mechanism and adapted when operated to actuate the valve mechanism, and an air-blow-off pipe opening into said body portion and acting as a guide for said float-operated mechanism.

13. A steam-trap comprising a body portion, a transversely-extending outlet-pipe therefor, a valve mechanism suspended upon the inner end of said pipe and adapted when actuated to establish communication between the said pipe and interior of the body portion, a float-operated mechanism suspended from said valve mechanism and adapted when operated to actuate the valve mechanism, and an air-blow-off pipe opening into said body portion and acting as a guide for said float-operated mechanism, that portion of said air-blow-off pipe which depends into the body portion being perforated.

14. A steam-trap comprising a body portion, a transversely-extending outlet-pipe therefor, a valve mechanism suspended upon the inner end of said pipe and adapted when actuated to establish communication between the said pipe and interior of the body portion, a float-operated mechanism suspended from said valve mechanism and adapted when operated to actuate the valve mechanism, an air-blow-off pipe opening into said body portion and acting as a guide for said float-operated mechanism, that portion of said air-blow-off pipe which depends into the body portion being perforated, an inlet-pipe opening into said body portion, and a discharge-pipe communicating with the interior of the body portion through the bottom thereof.

In testimony whereof I have hereunto set my hand in presence of two subscribing witnesses.

PATRICK J. HEFFERNAN.

Witnesses:
 EDWARD J. ELLIS,
 STEPHEN A. O'BRIEN.